(12) United States Patent
Kim et al.

(10) Patent No.: US 8,878,929 B2
(45) Date of Patent: Nov. 4, 2014

(54) THREE DIMENSIONAL SHAPE MEASUREMENT APPARATUS AND METHOD

(75) Inventors: Ho Kim, Seoul (KR); Kwang-Ill Kho, Seoul (KR); Hee-Wook You, Anyang-si (KR); Jae-Myeong Song, Seongnam-si (KR)

(73) Assignee: Koh Young Technology Inc., Seoul (KR)

( * ) Notice: Subject to any disclaimer, the term of this patent is extended or adjusted under 35 U.S.C. 154(b) by 956 days.

(21) Appl. No.: 12/787,728

(22) Filed: May 26, 2010

(65) Prior Publication Data

US 2010/0302364 A1 Dec. 2, 2010

(30) Foreign Application Priority Data

| May 27, 2009 | (KR) | 10-2009-0046669 |
|---|---|---|
| May 27, 2009 | (KR) | 10-2009-0046671 |
| Mar. 16, 2010 | (KR) | 10-2010-0023521 |
| May 24, 2010 | (KR) | 10-2010-0047920 |

(51) Int. Cl.

| H04N 7/18 | (2006.01) |
| G01S 17/36 | (2006.01) |
| G01B 11/25 | (2006.01) |
| G01B 11/22 | (2006.01) |
| G01S 17/89 | (2006.01) |
| G06T 7/00 | (2006.01) |

(52) U.S. Cl.
CPC .............. *G01B 11/22* (2013.01); *G01S 17/36* (2013.01); *G01B 11/2531* (2013.01); *G01S 17/89* (2013.01); *G06T 7/0057* (2013.01)
USPC .......................................... 348/136

(58) Field of Classification Search
CPC ............................ G01S 17/23; G01S 17/89

USPC ........................................................ 348/136
See application file for complete search history.

(56) References Cited

U.S. PATENT DOCUMENTS

| 2004/0105580 A1 | 6/2004 | Hager et al. |
| 2006/0082590 A1 | 4/2006 | Stevick et al. |
| 2006/0158664 A1* | 7/2006 | Koh et al. ............... 356/604 |
| 2007/0177159 A1* | 8/2007 | Kim et al. ............... 356/601 |
| 2007/0223805 A1* | 9/2007 | Jeon et al. ............... 382/154 |

FOREIGN PATENT DOCUMENTS

| CN | 1955635 | 5/2007 |
| CN | 1982841 A | 6/2007 |
| DE | 197 49 435 A1 | 5/1999 |
| DE | 101 49 750 A1 | 9/2002 |

(Continued)

OTHER PUBLICATIONS

"Parallel computing", Wikipedia, http://en.wikipedia.org/w/index.php?oldid=292081798.

*Primary Examiner* — Jeremaiah C Hallenbeck-Huber
(74) *Attorney, Agent, or Firm* — Kile Park Reed & Houtteman PLLC

(57) ABSTRACT

A three dimensional shape measurement apparatus includes m projecting sections, each of which includes a light source and a grating element, and, while moving the grating element by n times, projects a grating pattern light onto a measurement target for each movement, wherein the 'n' and the 'm' are natural numbers greater than or equal to 2, an imaging section photographing a grating pattern image reflected by the measurement target, and a control section controlling that, while photographing the grating pattern image by using one of the m projecting sections, a grating element of at least another projecting section is moved. Thus, measurement time may be reduced.

5 Claims, 16 Drawing Sheets

(56) References Cited

FOREIGN PATENT DOCUMENTS

| | | |
|---|---|---|
| DE | 102 26 398 A1 | 1/2004 |
| DE | 10 2005 040 772 A1 | 1/2007 |
| DE | 10 2006 059 132 A1 | 6/2007 |
| DE | 10 2008 030 555 A1 | 1/2009 |
| JP | 07-019825 | 1/1995 |
| JP | 09-068415 A | 3/1997 |
| JP | 10-023203 | 1/1998 |
| JP | 11-211443 A | 8/1999 |
| JP | 11-316114 | 11/1999 |
| JP | 2003-279335 A | 10/2003 |
| JP | 2004-309240 A | 11/2004 |
| JP | 2005-003409 A | 1/2005 |
| JP | 2005-214653 A | 8/2005 |
| JP | 2005-337943 A | 12/2005 |
| JP | 2006-275529 A | 10/2006 |
| JP | 2007-026217 | 2/2007 |
| JP | 2007-187622 | 7/2007 |
| JP | 2007-327957 A | 12/2007 |
| JP | 2008-224629 | 9/2008 |
| KR | 10-2004-0071531 | 8/2004 |
| KR | 10-2007-0122014 | 12/2007 |
| WO | 96/12160 | 4/1996 |
| WO | 2007/061632 | 5/2007 |

* cited by examiner

FIG. 3

| Photographing Image by Camera | Photographing Image 1 | Photographing Image 2 | Photographing Image 3 | Photographing Image 4 | Photographing Image 5 | Photographing Image 6 | Photographing Image 7 | Photographing Image 8 |
|---|---|---|---|---|---|---|---|---|
| First Projecting Section | | Moving Grating | | Moving Grating | | Moving Grating | | Moving Grating |
| Second Projecting Section | Moving Grating | | Moving Grating | | Moving Grating | | Moving Grating | |

US 8,878,929 B2

THREE DIMENSIONAL SHAPE MEASUREMENT APPARATUS AND METHOD

CROSS REFERENCE TO RELATED APPLICATION

This application claims priority from and the benefit of Korean Patent Applications No. 2009-46669 filed on May 27, 2009, No. 2009-46671 filed on May 27, 2009, No. 2010-23521 filed on Mar. 16, 2010, and No. 2010-47920 filed on May 24, 2010, which are hereby incorporated by reference for all purposes as if fully set forth herein.

BACKGROUND OF THE INVENTION

1. Field of the Invention

Exemplary embodiments of the present invention relate to a three dimensional shape measurement apparatus and a method of measuring a three dimensional shape. More particularly, exemplary embodiments of the present invention relate to a three dimensional shape measurement apparatus and a method of measuring a three dimensional shape capable of reducing measurement time.

2. Discussion of the Background

Generally, a three dimensional shape measurement apparatus measures a three dimensional shape of a measurement target by using a photographed image. The three dimensional shape measurement apparatus may include a projecting section illuminating light to the measurement target, a camera section photographing an image by using the light reflected by the measurement target, and a control section controlling the projecting section and the camera section and arithmetically processing the image to measure the three dimensional shape.

As described above, since the three dimensional shape measurement apparatus arithmetically processes the photographed image of the measurement target to measure the three dimensional shape, reducing measurement time for the three dimensional shape of the measurement target enhances rapidity and efficiency of work, to thereby reduce measurement cost. Thus, the measurement time is very important factor.

In a conventional three dimensional shape measurement apparatus, the following examples may be factors increasing the above mentioned measurement time.

First, the measurement time increases according to a photographing method and a grating-moving method.

FIG. 1 is a block diagram illustrating a method of measuring a three dimensional shape using a conventional three dimensional shape measurement apparatus.

Referring to FIG. 1, when using two projecting sections, conventionally, a plurality of images is photographed while a grating of a first projecting section is moved, and then a plurality of images is photographed while a grating of a second projecting section is moved.

However, since a grating is moved after photographing of camera, photographing time and movement time of the grating are independently required. Thus, total measurement time increases, and more increases as the number of the projecting sections increases.

Second, when a measurement target having a relatively large area is divided into a plurality of measurement areas and measured, long measurement time is required.

In case that images are photographed for each measurement area with respect to the measurement target having a relatively large area, and a three dimensional shape of the measurement target is measured by using the images, it is required that the camera section photographs an image for any one measurement area, and thereafter the image is arithmetically processed to measure a three dimensional shape in the measurement area.

However, in case that arithmetical process for the photographed image becomes a little longer, it may take a long time that a measurement target area is moved to each measurement area of the measurement target and in addition, the three dimensional shape measurement apparatus measures three dimensional shapes of all the measurement areas.

Third, it is limited to reducing photographing time of a camera and moving time of a grating element.

In order to rapidly inspect a board, it is required that photographing time of a camera and moving time of a grating element is reduced. However, when photographing time of a camera is reduced, a reflection grating image is not sufficiently received to thereby prevent accurate inspection. In addition, moving time of a grating element is very limited. Thus, it is difficult to substantially reduce inspection time.

Fourth, in case that a measurement target has a relatively small size, measurement time needlessly increases.

In order to inspect a measurement target having a relatively small size, for example, an LED bar, a plurality of measurement targets is inspected in a status that the measurement targets are mounted on an inspection board such as a jig. Thus, both a portion in which the measurement targets exist and a portion in which the measurement targets do not exist are in a field of view of a camera.

Accordingly, when image data are acquired for all the areas in the field of view of the camera, and the image data are processed, unnecessary data process is performed for the portion in which the measurement targets do not exist, to increase data processing time and thereby increase measurement time.

SUMMARY OF THE INVENTION

Exemplary embodiments of the present invention provide a three dimensional shape measurement apparatus capable of reducing measurement time for a three dimensional shape.

Exemplary embodiments of the present invention also provide a method of measuring a three dimensional shape capable of reducing measurement time for a three dimensional shape.

Exemplary embodiments of the present invention also provide a board inspection apparatus and a method of inspecting a board using the board inspection apparatus capable of reducing measurement time and enhancing measurement quality.

Exemplary embodiments of the present invention also provide a method of measuring a three dimensional shape capable of selectively measuring only an area in which measurement targets exist to reduce measurement time.

An exemplary embodiment of the present invention discloses a three dimensional shape measurement apparatus. The three dimensional shape measurement apparatus includes m projecting sections, each of which includes a light source and a grating element, and, while moving the grating element by n times, projects a grating pattern light onto a measurement target for each movement, wherein the 'n' and the 'm' are natural numbers greater than or equal to 2, an imaging section photographing a grating pattern image reflected by the measurement target, and a control section controlling that, while photographing the grating pattern image by using one of the m projecting sections, a grating element of at least another projecting section is moved.

When the m is 2, while photographing the grating pattern image by one time by using a first projecting section, the control section may move the grating element of a second projecting section by $2\pi/n$, and then while photographing the grating pattern image by one time by using the second projecting section, the control section may move the grating element of the first projecting section by $2\pi/n$.

When the m is greater than or equal to 3, the control section may photograph the grating pattern image by m times by using the projecting sections for one time respectively, from a first projecting section to an m-th projecting section, and a grating element of a projecting section that is not used for the photographing time of the m times may be moved by $2\pi/n$ for non-photographing time. The control section may control that each projecting section moves the grating element thereof before at least two photographing times prior to projecting the grating pattern light.

The control section may control that the grating pattern image is photographed by using one projecting section of the m projecting sections, and then for immediately following photographing time of another projecting section, a grating element of the one projecting section is moved.

An exemplary embodiment of the present invention discloses a method of measuring a three dimensional shape. The method includes photographing a first image in a first measurement area of a measurement target, arithmetically processing the first image by a first central processing unit to produce a three dimensional shape in the first measurement area, photographing a second image in a second measurement area of the measurement target while the first central processing unit arithmetically processes the first image, and arithmetically processing the second image by a second central processing unit to produce a three dimensional shape in the second measurement area.

The method may further include photographing a third image in a third measurement area of the measurement target while arithmetically processing the second image by the second central processing unit, and arithmetically processing the third image by the first central processing unit to produce a three dimensional shape in the third measurement area.

Each of the first and second images may include a plurality of way images photographed with respect to the measurement target in different directions. Arithmetically processing each of the first and second images may be performed by arithmetically processing each image independently, and merging arithmetically processed data for the first and second images.

An exemplary embodiment of the present invention discloses a method of measuring a three dimensional shape. The method includes photographing a first image in a first measurement area of a measurement target in a first direction and a second direction, photographing a second image in a second measurement area of the measurement target at least in the first direction and the second direction, after photographing the first image, and dividing the first image into an image corresponding to the first direction and an image corresponding to the second direction and arithmetically processing the divided images by a plurality of central processing units, to produce a three dimensional shape in the first measurement area.

The central processing units may include a first central processing unit arithmetically processing the image corresponding to the first direction and a second central processing unit arithmetically processing the image corresponding to the second direction. At least one of the first and second central processing units may merge the arithmetically processed data for the image corresponding to the first direction and the image corresponding to the second direction.

Dividing the first image and arithmetically processing the divided images to produce the three dimensional shape may include dividing the first image into a plurality of segments and arithmetically processing the divided segments by the central processing units.

An exemplary embodiment of the present invention discloses a board inspection apparatus. The board inspection apparatus includes a stage supporting a board, a projecting section including a light source and a grating element, the projecting section illuminating a grating pattern light onto the board, and a camera sequentially opened from a first line to a last line to receive a reflection grating image reflected by the board. The grating element is moved for at least time interval for which the camera is opened from the first line to the last line.

The grating element may be not moved for a time interval for which all lines of the camera simultaneously receive the reflection grating image. The grating pattern light may be illuminated by the projection section for a predetermined time interval existing between a time at which the last line is opened and a time at which the first line is closed. The grating element may be moved by $2\pi/n$ per one time and n-1 times in total, and the camera may receive the reflection grating image by n times corresponding to movement of the grating element, wherein the 'n' is a natural number greater than or equal to 2.

An exemplary embodiment of the present invention discloses a method of inspecting a board by using at least two projecting sections, each of which includes a light source and a grating element, and a camera. The method includes sequentially opening the camera from a first line to a last line, illuminating a grating pattern light onto the board by using a first projecting section of the projecting sections, and moving a grating element included in at least one second projecting section different from the first projecting section for a predetermined time interval existing between a time at which the last line is opened and a time at which the last line is closed.

The first projecting section may illuminate the grating pattern light for a predetermined time interval existing between a time at which the last line is opened and a time at which the first line is closed.

An exemplary embodiment of the present invention discloses a method of inspecting a board. The method includes loading an inspection board on which a plurality of measurement targets are disposed to an inspection apparatus, dividing inspection areas in which the measurement targets are located in a field of view of a camera to acquire image data for each inspection area, and inspecting shapes of the measurement targets by using the acquired image data for each inspection area.

Dividing the inspection areas to acquire the image data may include illuminating a pattern light onto the measurement targets, and receiving reflection pattern lights reflected by the measurement targets by using the camera.

The measurement targets may correspond to boards disposed in a plurality of rows with a predetermined direction. The inspection board may correspond to a fixing supporter fixing the measurement targets.

Inspecting the shapes of the measurement targets may include mapping the acquired image data for each inspection area to generate a total image of each measurement target.

According to the present invention, photographing of a camera and movement of a grating is simultaneously performed, to thereby greatly reducing measurement time for a three dimensional shape. Also, thanks to reduction of measurement time, photographing time of the camera may be sufficiently increased to secure light amount required for photographing.

In addition, multiple images are arithmetically processed by using a plurality of central processing units to thereby increase processing speed for the images.

In addition, in moving a grating element by using one projecting section and a camera, and photographing a plurality of phase-transited images, the grating element is moved for rolling time of the camera for which photographing an image is not performed, to thereby reduce measurement time.

In addition, in photographing an image of a measurement target by using at least two projecting sections, the grating element is moved for a frame interval for which an associated projecting section does not illuminate light, to thereby more reduce measurement time.

In addition, in measuring an inspection board on which a plurality of measurement targets are mounted, only an inspection area in which the measurement targets are located is measured, to thereby reduce photographing time of a camera.

In addition, image data for only an inspection area are used, data amount required to be processed may be reduced, and especially, data amount for comparison in image-mapping may be reduced to greatly reduce measurement time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 is a block diagram illustrating a method of driving a three dimensional shape measurement apparatus including two projecting sections according to an exemplary embodiment of the present invention.

DETAILED DESCRIPTION OF THE ILLUSTRATED EMBODIMENTS

Figure 1:
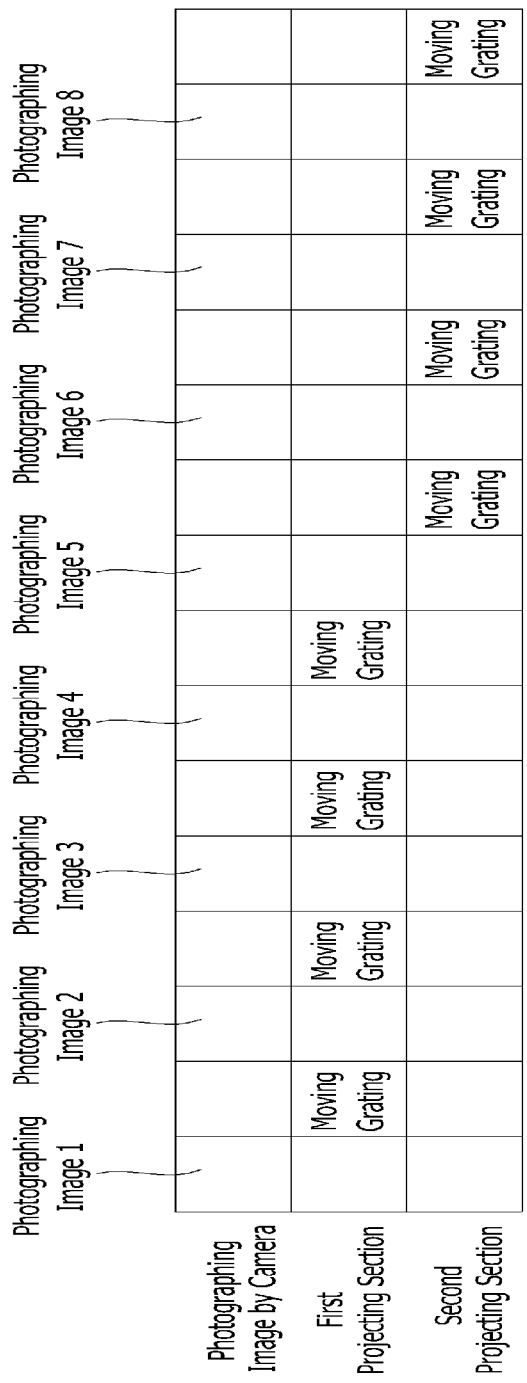
FIG. 1 is a block diagram illustrating a method of measuring a three dimensional shape using a conventional three dimensional shape measurement apparatus.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Figure 2:
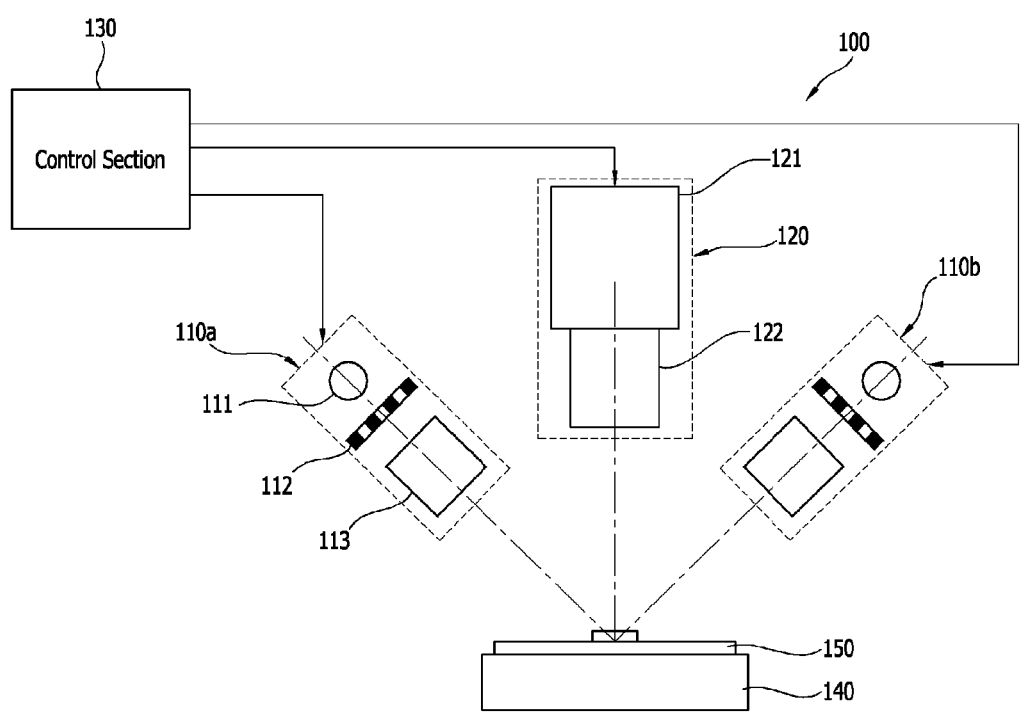
FIG. 2 is a schematic view illustrating a three dimensional shape measurement apparatus according to an exemplary embodiment of the present invention.

FIG. 2 is a schematic view illustrating a three dimensional shape measurement apparatus according to an exemplary embodiment of the present invention.

Referring to FIG. 2, a three dimensional shape measurement apparatus 100 according to an exemplary embodiment of the present invention includes projecting sections 110, the number of which is 'm', an imaging section 120 and a control section 130. The 'm' is a natural number greater than or equal to 2.

Each of the m projecting sections 110 projects a grating pattern light onto a measurement target 150 that is fixed to a work stage 140. The projecting sections 110 may be disposed to illuminate grating pattern lights inclined with respect to a normal line of the measurement target 150 by a predetermined angle. For example, the three dimensional shape measurement apparatus 100 may include 2, 3, 4 or 6 projecting sections 110, and the plurality of the projecting sections 110 may be symmetrically disposed with respect to the normal line of the measurement target 150.

Each of the projecting sections 110 includes a light source 111 and a grating element 112. Each projecting section 110 may further include a projecting lens part 113. The light source 111 illuminates light toward the measurement target 150. The grating element 112 converts the light generated from the light source 111 into the grating pattern light according to a grating pattern thereof. The grating element 112 is moved using a grating-moving instrument (not shown) such as an actuator by $2\pi/n$ per one time and n times in total to generate the grating pattern light that is phase-transited. The 'n' is a natural number greater than or equal to 2. The projecting lens part 113 projects the grating pattern light generated by the grating element 112 onto the measurement target 150. The projecting lens part 113 may include, for example, combination of a plurality of lenses, and focuses the grating pattern light generated by the grating element 112 to project the focused grating pattern light onto the measurement target 150. Thus, each projecting section 110 projects the grating pattern light onto the measurement target 150 for each movement while the grating element 112 is moved by n times.

The imaging section 120 photographs a grating pattern image that is reflected from the measurement target 150 by the grating pattern light projected onto the measurement target 150. Since the three dimensional shape measurement apparatus 100 includes m projecting sections 110, and photographing is performed by n times with respect to each projecting section 110, the imaging section 120 photographs the grating pattern image by n×m times. The imaging section 120 may include a camera 121 and an imaging lens part 122 so as to photograph the grating pattern image. The camera 121 may employ a CCD or a CMOS camera. Thus, the grating pattern image reflected by the measurement target 150 is photographed by the camera 121 via the imaging lens part 122.

The control section 130 generally controls the components included in the three dimensional shape measurement apparatus 100. The control section 130 moves the grating element 112 by n times, and controls the projecting section 110 to project the grating pattern light onto the measurement target 150 for each movement. In addition, the control section 130 controls the imaging section 120 to photograph the grating pattern image reflected by the measurement target 150.

In order to reduce total measurement time of the three dimensional shape measurement apparatus 100, while photographing the grating pattern image by using one of the m projecting sections 110, the control section 130 controls the grating element 112 of at least one another projecting section 110 to move. For example, the grating pattern image is photographed by using one projecting section 110 of the m projecting sections 110, and then for immediately following photographing time of another projecting section 110, the control section 130 may move the grating element 112 of the one projecting section 110 by $2\pi/n$.

FIG. 3 is a block diagram illustrating a method of driving a three dimensional shape measurement apparatus including two projecting sections according to an exemplary embodiment of the present invention.

Referring to FIGS. 2 and 3, the three dimensional shape measurement apparatus 100 according to an exemplary embodiment of the present invention includes two projecting sections 110, for example, a first projecting section 110a and a second projecting section 110b.

The control section 130 moves the grating element 112 of the second projecting section 110b by a distance corresponding to a phase of $2\pi/n$, while photographing a grating pattern image 1 by one time by using the first projecting section 110a. Then, the control section 130 moves the grating element 112 of the first projecting section 110a by a distance corresponding to a phase of $2\pi/n$, while photographing a grating pattern image 2 by one time by using the second projecting section 110*b*. In other words, the grating pattern image 1 is photographed by using the first projecting section 110*a*, and then for immediately following photographing time of the second projecting section 110*b*, the control section 130 moves the grating element 112 of the first projecting section 110*a*. Then, the control section 130 repeats the above processes by using the first projecting section 110*a* and the second projecting section 110*b* to control photographing of a grating pattern image 3 to a grating pattern image 8.

Thereafter, the control section 130 combines the grating pattern images 1, 3, 5 and 7 photographed by using the first projecting section 110*a* to acquire first phase information, and combines the grating pattern images 2, 4, 6 and 8 photographed by using the second projecting section 110*b* to acquire second phase information, and then the three dimensional shape of the measurement target 150 is measured by using the first phase information and the second phase information.

As described above, when photographing of the camera and moving of the grating is simultaneously performed, measurement time is greatly reduced in comparison with a method described in FIG. 1. In addition, thanks to reduction of measurement time, photographing time of the camera may be sufficiently increased, to thereby make it possible to acquire light amount required for photographing.

In FIG. 3, for example, a 4-bucket method is described, in which photographing is performed by four times for each projecting section 110. Alternatively, the above method may be applied to various bucket methods such as 3-bucket.

Meanwhile, when the three dimensional shape measurement apparatus 100 includes three or more projecting sections 110, the control section 130 controls photographing of the grating pattern image by m times, by using the projecting sections for one time respectively, from a first projecting section to a final projecting section, i.e., an m-th projecting section, and simultaneously, a grating element of a projecting section that is not used for the photographing time of the m times is moved by 2π/n for the non-photographing time. For example, a driving method will be described with reference to FIG. 4, for a case that a three dimensional shape measurement apparatus includes three projecting sections.

Figure 4:
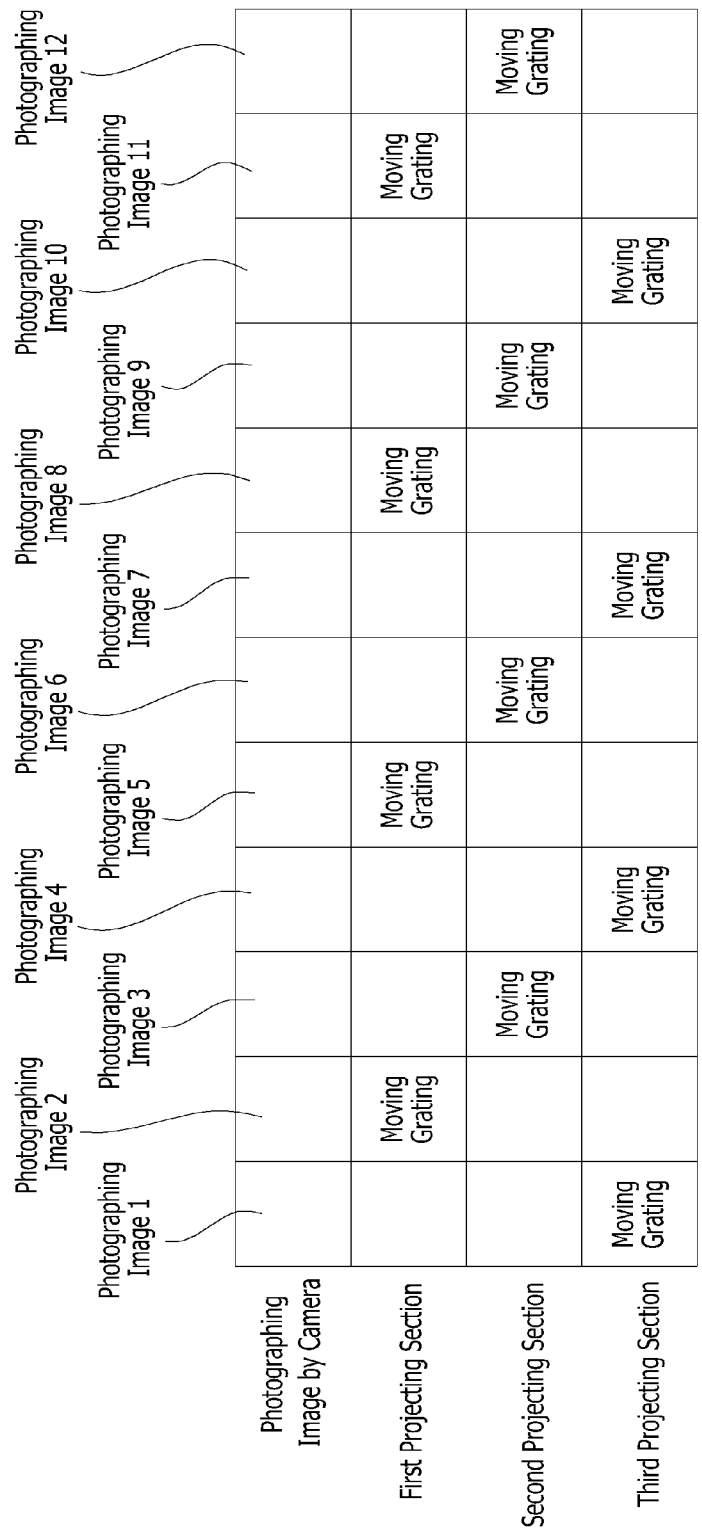
FIG. 4 is a block diagram illustrating a method of driving a three dimensional shape measurement apparatus including two projecting sections according to an exemplary embodiment of the present invention.

FIG. 4 is a block diagram illustrating a method of driving a three dimensional shape measurement apparatus including two projecting sections according to an exemplary embodiment of the present invention.

Referring to FIG. 4, a three dimensional shape measurement apparatus may include three projecting sections, for example, a first projecting section, a second projecting section and a third projecting section. For example, three projecting sections may be disposed apart from each other by an angle of 120 degrees with respect to the center of the measurement target.

While photographing a grating pattern image 1 by using the first projecting section of the three projecting sections, a grating element of one of the remaining projecting sections, for example, the third projecting section is moved by a distance corresponding to a phase of 2π/n. Then, while photographing a grating pattern image 2 by using the second projecting section, a grating element of one of the remaining projecting sections, for example, the first projecting section is moved by a distance corresponding to a phase of 2π/n. Thereafter, while photographing a grating pattern image 3 by using the third projecting section, a grating element of one of the remaining projecting sections, for example, the second projecting section is moved by a distance corresponding to a phase of 2π/n. Then, the above processes are repeated by using the first projecting section, the second projecting section and the third projecting section to photograph a grating pattern image 4 to a grating pattern image 12.

Thanks to reduction of photographing time, movement time of the grating element may be relatively increased. For example, when the photographing time is about 5 ms, and the movement time of the grating element is about 7 ms, the movement time of the grating element becomes longer than the photographing time by about 2 ms. Thus, since the grating element is not movable within one photographing time, the movement of the grating element is moved for two photographing times. Accordingly, before at least two photographing times prior to projecting the grating pattern light, each projecting section may preferably move the grating element thereof. For example, before photographing the grating pattern image 4, the first projecting section may preferably move the grating element thereof for two photographing times of the grating pattern image 2 and the grating pattern image 3. To this end, each projecting section may preferably move the grating element thereof, directly after photographing the grating pattern image.

After completing photographing the grating pattern image 1 to the grating pattern image 12, the grating pattern images 1, 4, 7 and 10 photographed by using the first projecting section are combined to acquire first phase information, the grating pattern images 2, 5, 8 and 11 photographed by using the second projecting section are combined to acquire second phase information, and the grating pattern images 3, 6, 9 and 12 photographed by using the third projecting section are combined to acquire third phase information. Then, the three dimensional shape of the measurement target is measured by using the first phase information, the second phase information and the third phase information.

In FIG. 4, for example, a 4-bucket method is described, in which photographing is performed by four times for each projecting section. Alternatively, the above method may be applied to various bucket methods such as 3-bucket. In addition, the method in FIG. 4 may be applied to a three dimensional shape measurement apparatus including four or more projecting sections.

Figure 5:
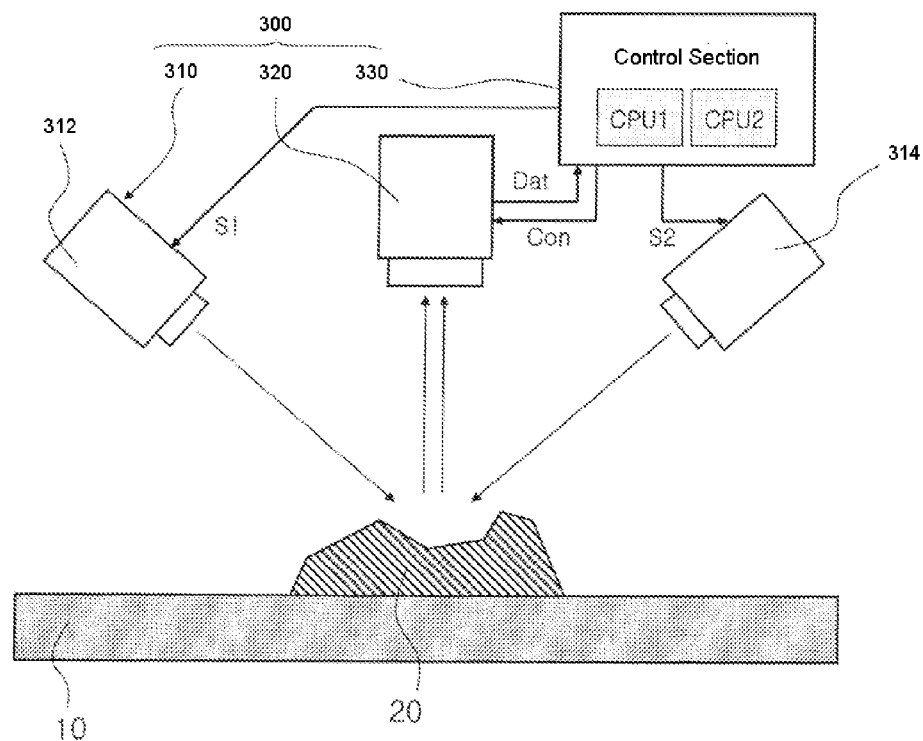
FIG. 5 is a schematic view illustrating a three dimensional shape measurement apparatus according to an exemplary embodiment of the present invention.

FIG. 5 is a schematic view illustrating a three dimensional shape measurement apparatus according to an exemplary embodiment of the present invention.

Referring to FIG. 5, a three dimensional shape measurement apparatus 300 according to an exemplary embodiment of the present invention includes a projecting section 310, a camera section 320 and a control section 330. For example, the three dimensional shape measurement apparatus 300 measures a three dimensional shape of a predetermined measurement target 20 formed on a base board 10.

The projecting section 310 is disposed over the base board 10 to illuminate a light onto the measurement target 20 formed on the base board 10. The projecting section 310 includes at least one illumination unit, and for example, may include a first illumination unit 312 and a second illumination unit 314.

The first illumination unit 312 is disposed over the base board 10 to illuminate a first light in a first direction inclined with respect to the measurement target 20. The second illumination unit 314 illuminates a second light in a second direction symmetrical to the first direction with respect to the base board 10.

Particularly, the first illumination unit 312 may illuminate a first grating pattern light toward the measurement target 20, and the second illumination unit 314 may illuminate a second grating pattern light toward the measurement target 20.

In an exemplary embodiment, each of the first and second illumination units 312 and 314 may include a light source (not shown) generating light, a grating unit through which the light from the light source passes to form the first grating pattern light or the second grating pattern light, and a projecting lens (not shown) projecting the first grating pattern light or the second grating pattern light on the measurement target 20.

The grating unit may have various forms. For example, a grating pattern having a shielding portion and a transmitting portion may be patterned on a glass substrate to form the grating unit, or the grating unit may be formed using a liquid crystal display panel. Each of the first and second illumination units 312 and 314 may further include an actuator (not shown) minutely moving the grating unit.

The projecting lens may be formed, for example, by combining a plurality of lenses, and the projecting lens focuses the first grating pattern light or the second grating pattern light generated by the grating unit on the measurement target 20.

The camera section 320 is disposed over the base board 10 to photograph reflection light reflected by the measurement target 20. In other words, the camera section 320 may capture the first grating pattern light or the second grating pattern light reflected by the measurement target 20. The camera section 320 may be disposed at the middle of between the first and second illumination units 312 and 314.

The camera section 320 may include, for example, a camera unit (not shown) capturing the first grating pattern light or the second grating pattern light and a receiving lens (not shown) focusing the first grating pattern light or the second grating pattern light to provide the camera unit.

The control section 330 controls the projecting section 310 and the camera section 320, and processes the first and second grating pattern lights captured by the camera section 320 to measure a two dimensional shape and/or a three dimensional shape.

Particularly, the control section 330 provides first and second illumination control signals S1 and S2 to the first and second projecting sections 312 and 314, respectively, to thereby control generation, amount, intensity, etc. of the first and second grating pattern lights. In addition, the control section 330 provides the camera section 320 with a photographing control signal Con, to thereby control the camera section 320 to capture the first and second grating pattern lights at a proper timing, and receives data Dat including the captured grating pattern light from the camera section 320.

The three dimensional shape measurement apparatus 300 may also measure a large area measurement target (not shown) having a relatively large area, as is different from in FIG. 5. In order to measure a three dimensional shape of the large area measurement target, the large area measurement target may need to be divided into a plurality of measurement areas. In other words, the three dimensional shape measurement apparatus 300 measures and combines three dimensional shapes for the measurement areas, to thereby measure a three dimensional shape of the large area measurement target. Thus, the three dimensional shape measurement apparatus 300 photographs an image in any one measurement area, and then may need to photograph an image in another measurement area.

When the image in the "one measurement area", which is photographed in a previous timing is defined as "previous image", and the image in the "another measurement area", which is photographed in a next timing is defined as "present image", the three dimensional shape measurement apparatus 300 arithmetically processes the previous image, which is already photographed, by using a plurality of central processing units while photographing the present image. For example, the control section 330 may include first and second central processing units CPU1 and CPU2 to arithmetically process the previous image while photographing the present image.

Figure 6:
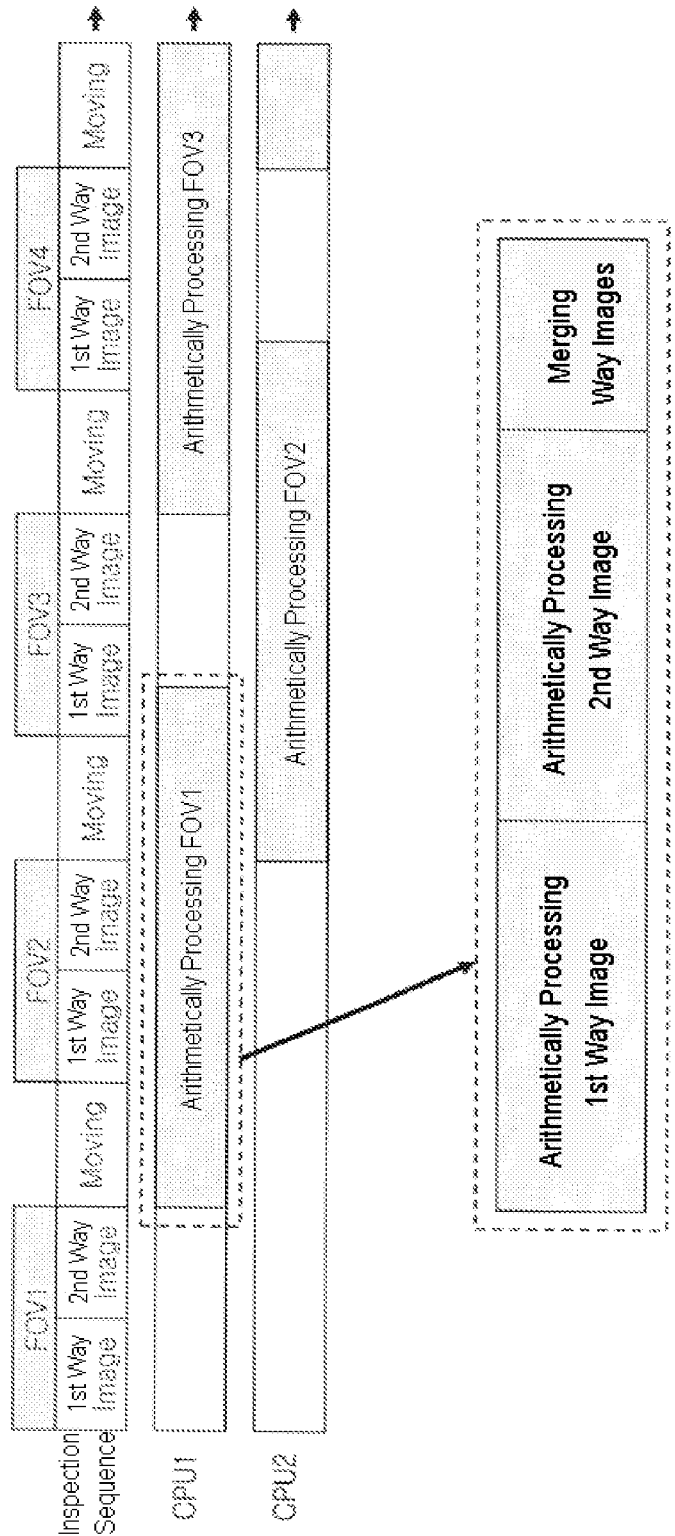
FIGS. 6 and 7 are block diagrams illustrating a method of arithmetically processing multiple images according to an exemplary embodiment of the present invention.
Figure 7:
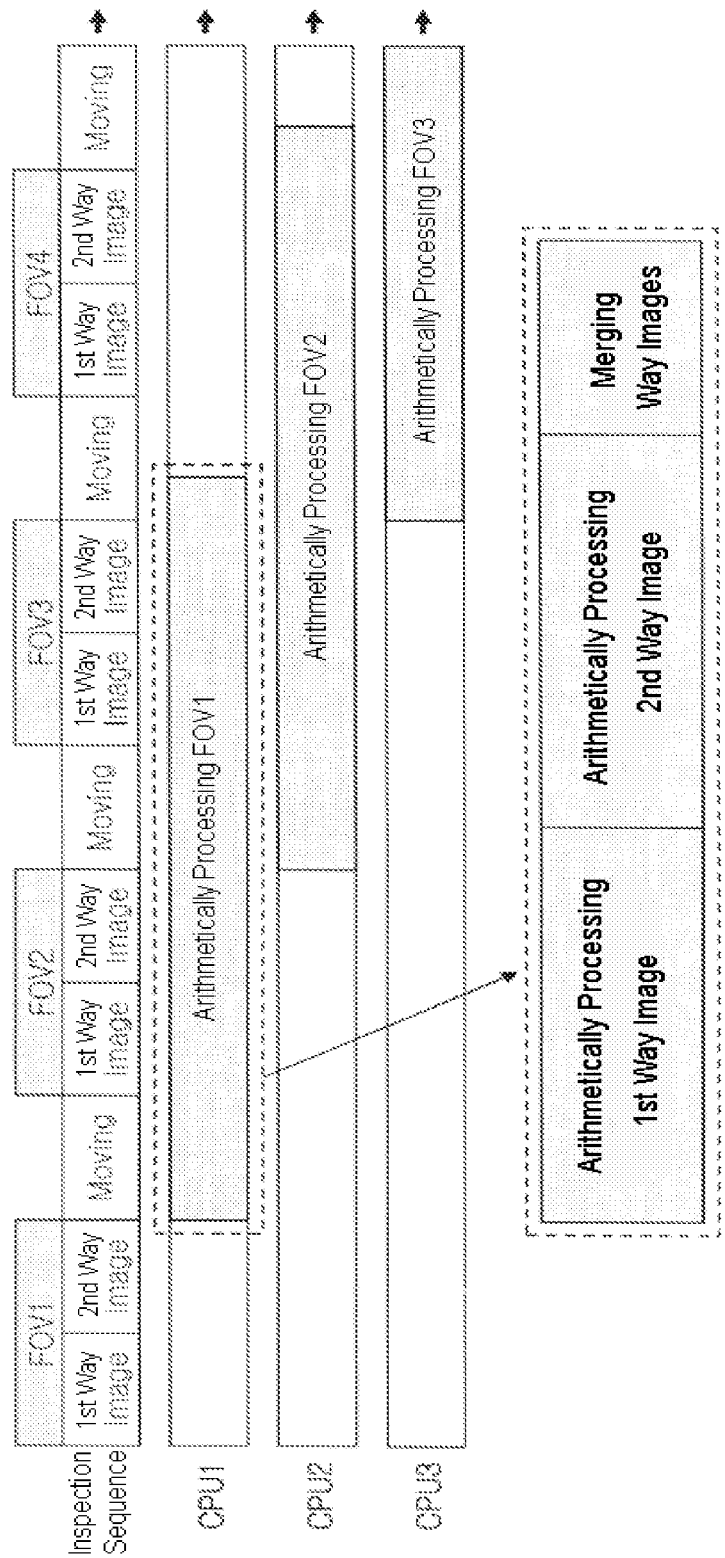

FIGS. 6 and 7 are block diagrams illustrating a method of arithmetically processing multiple images according to an exemplary embodiment of the present invention. Particularly, FIG. 6 illustrates a process of arithmetically processing multiple images by using two central processing units CPU1 and CPU2, and FIG. 7 illustrates a process of arithmetically processing multiple images by using three central processing units CPU1, CPU2 and CPU3.

In an exemplary embodiment, the three dimensional shape measurement apparatus is substantially the same as the three dimensional shape measurement apparatus 300 in FIG. 5, and thus any further description will be omitted.

Referring to FIG. 6, in an exemplary embodiment, the measurement target may be measured with being divided into a plurality of measurement areas FOV1, FOV2, FOV3, FOV4, . . . , etc. For example, the three dimensional shape measurement apparatus measures a three dimensional shape in a first measurement area FOV1, and then a measurement target area is moved to a second measurement area FOV2. Thereafter, the three dimensional shape measurement apparatus measures a three dimensional shape in the second measurement area FOV2, and then the measurement target area is moved to a third measurement area FOV3. As described above, the three dimensional shape measurement apparatus may repeat measurement for the three dimensional shape and movement of the measurement target area for each measurement area.

In a method of arithmetically processing multiple images according to an exemplary embodiment of the present invention, firstly, a first image is photographed in the first measurement area FOV1 of the measurement target by using the three dimensional shape measurement apparatus. The first image may include a plurality of way images that are photographed with respect to the measurement target in different directions. For example, the first image may include first and second way images. The first way image is formed by the light from the first illumination unit 312 in FIG. 5, and the second way image is formed by the light from the second illumination unit 314 in FIG. 5.

After the first image is photographed in the first measurement area FOV1, the first image is arithmetically processed by the first central processing unit CPU1. A method of arithmetically processing the first image may include a step of arithmetically processing the first way image, a step of arithmetically processing the second way image, and a step of merging the first and second way images. The first central processing unit CPU1 may be included in the control section 330 in FIG. 5.

While the first central processing unit CPU1 arithmetically processes the first image, the measurement target area of the three dimensional shape measurement apparatus is moved from the first measurement area FOV1 to the second measurement area FOV2, and a second image is photographed in the second measurement area FOV2. The second image may include two way images, which is the same as the first image.

After the second image is photographed in the second measurement area FOV2, the second image is arithmetically processed by the second central processing unit CPU2 that is different from the first central processing unit CPU1. A method of arithmetically processing the second image is substantially the same as the method of arithmetically processing the first image.

While the second central processing unit CPU2 arithmetically processes the second image, the measurement target area of the three dimensional shape measurement apparatus is moved from the second measurement area FOV2 to the third measurement area FOV3, and a third image is photographed in the third measurement area FOV3. The third image may include two way images, which is the same as the first and second images.

Meanwhile, in an exemplary embodiment, a process that the first central processing unit CPU1 arithmetically processes the first image is finalized before photographing the third image is completed.

After the third image is photographed in the third measurement area FOV3, the first central processing unit CPU1 arithmetically processes the third image. A method of arithmetically processing the third image is substantially the same as the method of arithmetically processing the first and second images.

As described above, a plurality of images is measured while the measurement target area of the three dimensional shape measurement apparatus is moved for each measurement area, and the images may be divided and arithmetically processed by using the first and second central processing units CPU1 and CPU2. In other words, the first central processing unit CPU1 may arithmetically process images photographed in odd numbered measurement areas, and the second central processing unit CPU2 may arithmetically process images photographed in even numbered measurement areas.

Referring to FIG. 7, the images photographed in the measurement areas of the measurement target may be image-processed by using three central processing units CPU1, CPU2 and CPU3. In other words, the first central processing unit CPU1 may arithmetically process images photographed in 1, 4, 7, . . . , etc. numbered measurement areas, the second central processing unit CPU2 may arithmetically process images photographed in 2, 5, 8, . . . , etc. numbered measurement areas, and the third central processing unit CPU3 may arithmetically process images photographed in 3, 6, 9, . . . , etc. numbered measurement areas. As a result, the first central processing unit CPU1 may arithmetically process the first image photographed in the first measurement area FOV1, from a time that photographing in the first measurement area FOV1 is finished to a time that photographing in the fourth measurement area FOV4 is finished. In addition, the second and third central processing units CPU1 and CPU2 may arithmetically process an image in each measurement area for substantially the same time as a time for which the arithmetical process of the first central processing unit CPU1 is possible.

In FIGS. 6 and 7, the image for each measurement area is arithmetically processed by using two or three central processing units. Alternatively, the image for each measurement area may be arithmetically processed by using four or more central processing units.

Figure 8:
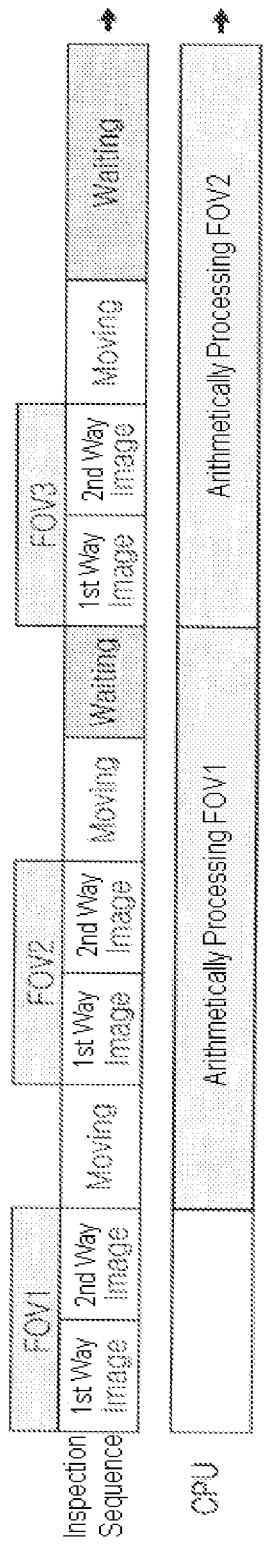
FIG. 8 is a block diagram illustrating a process of arithmetically processing multiple images by using a single CPU.

FIG. 8 is a block diagram illustrating a process of arithmetically processing multiple images by using a single central processing unit.

Referring to FIG. 8, when the multiple images photographed in each measurement area are arithmetically processed by using a single central processing unit CPU, measurement time may be lengthened in measuring the three dimensional shape of the measurement target. That is, as the single central processing unit CPU arithmetically processes all the images photographed in each measurement area, the three dimensional shape measurement apparatus may have a waiting time between photographing processes for the measurement areas. Thus, measurement time for photographing the three dimensional shape of the measurement target may be lengthened.

However, in the present embodiment, the image of each measurement area is arithmetically processed by using the plurality of central processing units, and thus the waiting time between photographing processes for the measurement areas may be removed, to thereby reduce a time for measuring the three dimensional shape of the measurement target.

Figure 9:
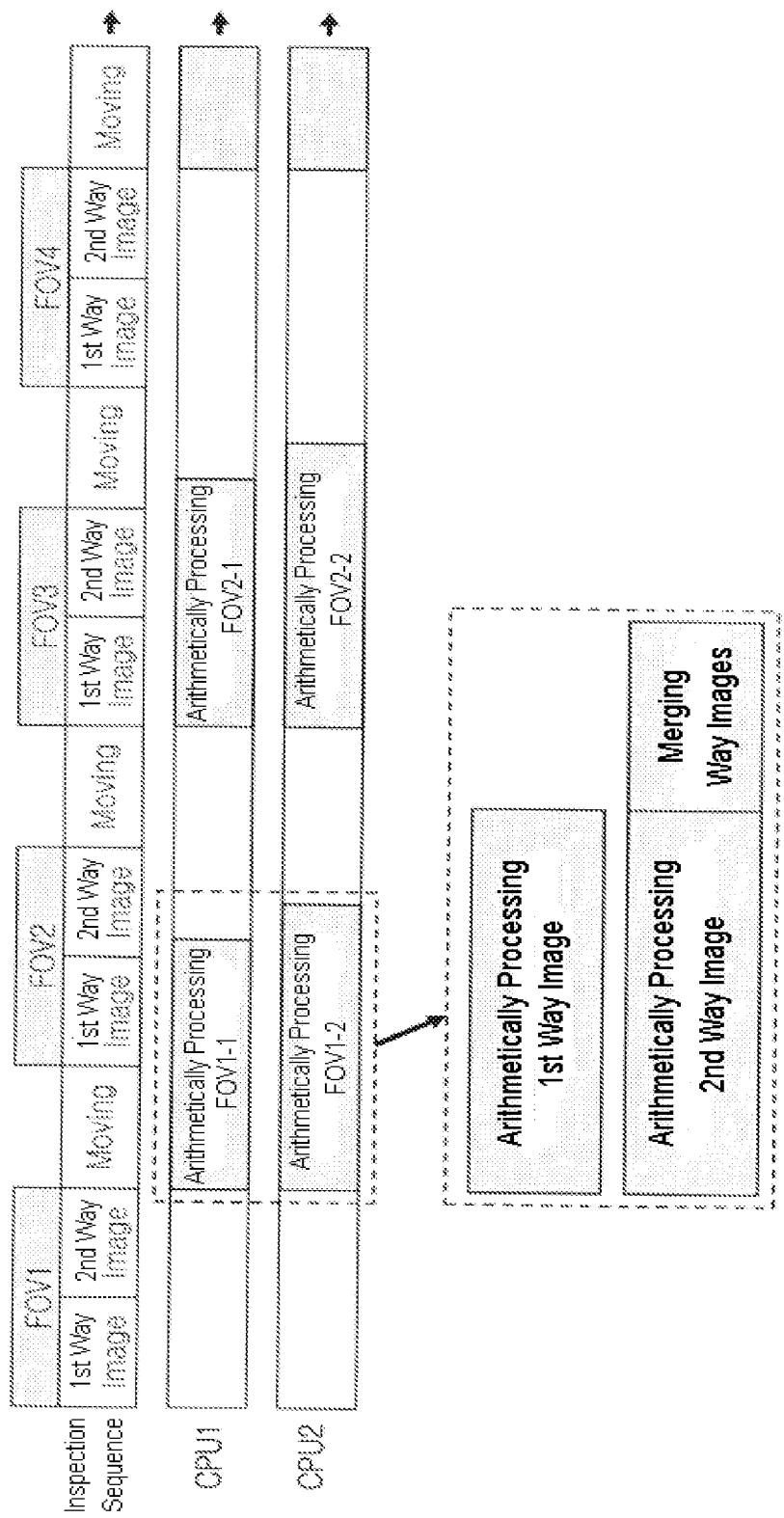
FIG. 9 is a block diagram illustrating a method of arithmetically processing multiple images according to an exemplary embodiment of the present invention.

FIG. 9 is a block diagram illustrating a method of arithmetically processing multiple images according to an exemplary embodiment of the present invention.

The method of arithmetically processing multiple images in FIG. 9 is substantially the same as the method of arithmetically processing multiple images described in FIG. 6 except for the arithmetical process of the first and second central processing units CPU1 and CPU2. Thus, any further description except for the arithmetical process of the first and second central processing units CPU1 and CPU2 will be omitted.

Referring to FIG. 9, a first central processing unit CPU1 arithmetically processes a portion of the image photographed in each measurement area, and a second central processing unit CPU2 arithmetically processes a remaining portion of the image. For example, the first central processing unit CPU1 arithmetically processes a portion of the first image photographed in the first measurement area, and the second central processing unit CPU2 arithmetically processes a remaining portion of the first image.

In an exemplary embodiment, the image photographed in each measurement area includes first and second way images photographed in different directions, and thus the first central processing unit CPU1 may arithmetically process the first way image, and the second central processing unit CPU2 may arithmetically process the second way image. One of the first and second central processing units CPU1 and CPU2 arithmetically processes merging of arithmetically processed data for the first and second way images.

According to the present embodiment, when the image photographed in each measurement area includes a plurality of way images, central processing units, the number of which is the same as the number of the way images, arithmetically process the way images, respectively. Thus, measurement time for the three dimensional shape of the measurement target may be reduced.

Figure 10:
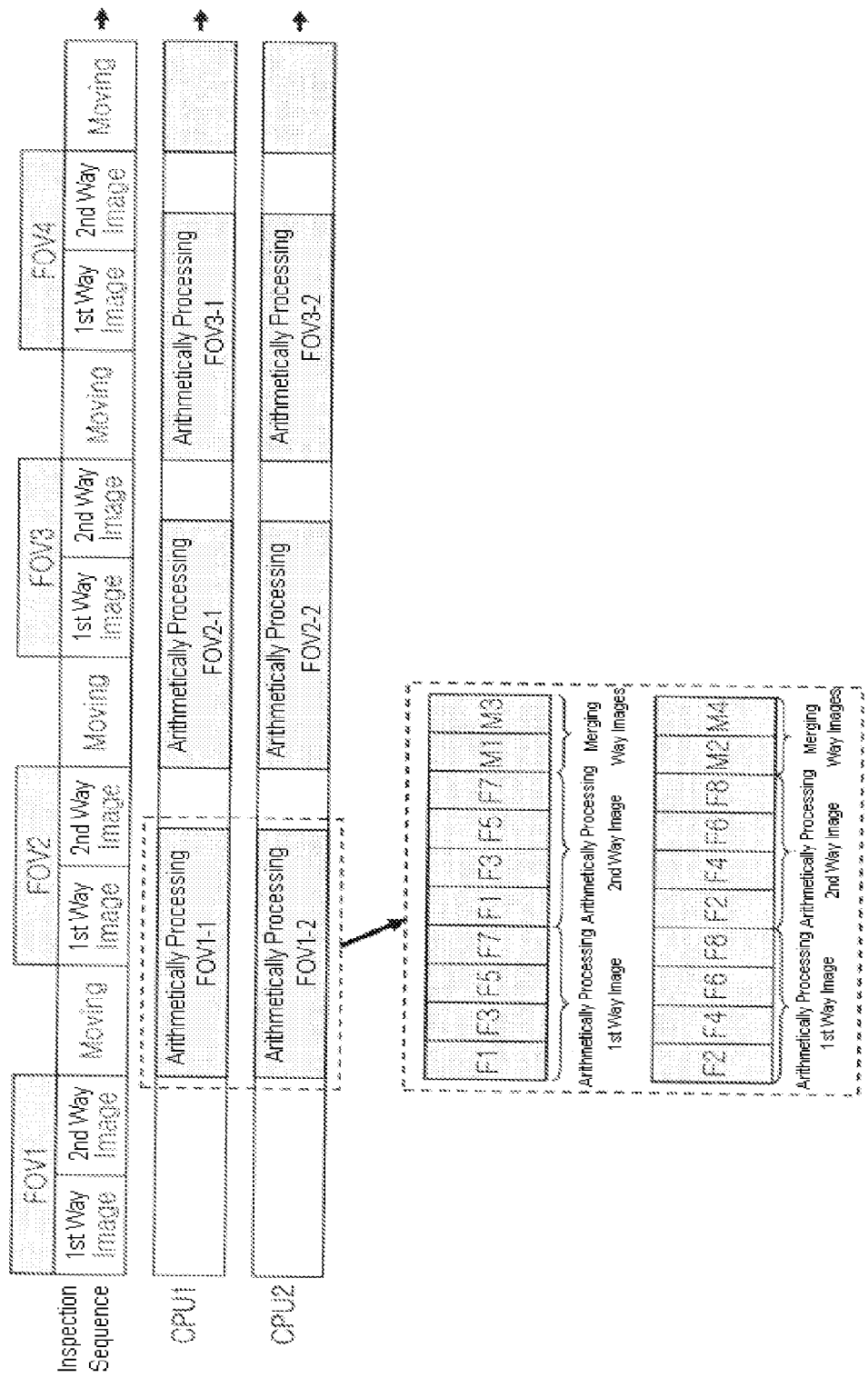
FIG. 10 is a block diagram illustrating a method of arithmetically processing multiple images according to an exemplary embodiment of the present invention.

FIG. 10 is a block diagram illustrating a method of arithmetically processing multiple images according to an exemplary embodiment of the present invention.

The method of arithmetically processing multiple images in FIG. 10 is substantially the same as the method of arithmetically processing multiple images described in FIG. 6 except for the arithmetical process of the first and second central processing units CPU1 and CPU2. Thus, any further description except for the arithmetical process of the first and second central processing units CPU1 and CPU2 will be omitted.

Referring to FIG. 10, the image photographed in each measurement area is divided into a plurality of segments, and the divided segments are arithmetically processed by a plurality of central processing units.

For example, when the image photographed in each measurement area includes first and second way images photographed in different directions, arithmetical process for each of the first and second way images may be divided into eight segments F1, F2, F3, F4, F5, F6, F7 and F8. The first central processing unit CPU1 may arithmetically process odd numbered segments F1, F3, F5 and F7, and the second central processing unit CPU2 may arithmetically process even numbered segments F2, F4, F6 and F8.

The process of merging arithmetically processed data for the first and second way images may also be divided into a plurality of segments. For example, the process of merging may be divided into four segments M1, M2, M3 and M4. The first central processing unit CPU1 may merge the first and third segments M1 and M3, and the second central processing unit CPU2 may merge the second and fourth segments M2 and M4.

According to the present embodiment, the image photographed in each measurement area is divided into a plurality of segments, and a plurality of central processing units arithmetically processes the segments. Thus, measurement time for the three dimensional shape of the measurement target may be reduced.

Figure 11:
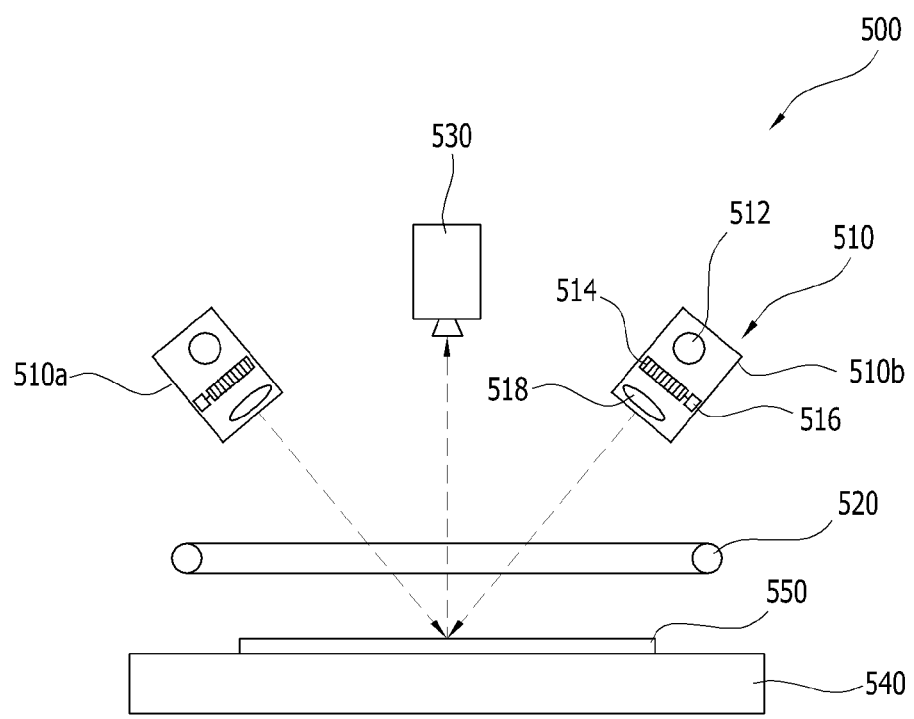
FIG. 11 is a schematic view illustrating a board inspection apparatus according to an exemplary embodiment of the present invention.

FIG. 11 is a schematic view illustrating a board inspection apparatus according to an exemplary embodiment of the present invention.

Referring to FIG. 11, a board inspection apparatus 500 according to an exemplary embodiment of the present invention includes a stage 540 supporting and moving a board 550 on which a measurement target is formed, at least one projecting section 510 illuminating a grating pattern light onto the board 550, and a camera 530 photographing a reflection grating image reflected by the board 550. In addition, the board inspection apparatus 500 may further include an illuminating section 520 disposed adjacent to the stage 540 to illuminate a light onto the board 550 independently of the projecting section 510.

The projecting section 510 illuminates the grating pattern light for acquiring three dimensional information such as height information, visibility information, etc. onto the board 550 in order to measure a three dimensional shape of the measurement target formed on the board 550. For example, the projecting section 510 includes a light source 512 generating a light, a grating element 514 converting the light from the light source 512 into the grating pattern light, a grating-moving instrument 516 pitch-moving a grating element 514 and a projecting lens 518 projecting the grating pattern light converted by the grating element 514 onto the measurement target. The grating element 514 may be moved using a grating-moving instrument 516 such as a piezoelectric (PZT) actuator by $2\pi/n$ per one time and n−1 times in total, for phase transition of the grating pattern light. The 'n' is a natural number greater than or equal to 2. A plurality of projecting sections 710 may be disposed apart from each other by a substantially constant angle with respect to the center of the camera 530 so as to increase inspection accuracy.

The illuminating section 520 may have a circular ring shape, and installed adjacent to the stage 540. The illuminating section 520 illuminates a light onto the board 550 to set up an initial alignment, an inspection area, etc. of the board 550. For example, the illuminating section 520 may include a fluorescent lamp generating white light or a light emitting diode (LED) including at least one of a red LED, a green LED and a blue LED generating red light, green light and blue light, respectively.

The camera 530 photographs the reflection grating image of the board 550 by the grating pattern light from the projecting section 510, and a reflection image of the board 550 by the light from the illuminating section 520. For example, the camera 530 may be disposed over the board 550.

In an exemplary embodiment, the camera 530 may employ a camera having a rolling shutter mode using a CMOS sensor. The camera 530 having a rolling shutter mode does not photograph a snapshot of a total image for one frame of the measurement target, but sequentially scans an image for one frame of the measurement target by a line or a row from up to down to acquire image data.

The board inspection apparatus 500 having the above structure illuminates the light onto the board 550 by using the projecting section 510 or the illuminating section 520, and the image of the board 550 is photographed by using the camera 530, to thereby measure a three dimensional image and a two dimensional image of the board 550. The board inspection apparatus 500 illustrated in FIG. 11 is just an example, and the board inspection apparatus 500 may be variously modified to include one or more projecting section and camera.

Hereinafter, a method of inspecting a board by using the board inspection apparatus 500 having the above structure will be described in detail.

Figure 12:
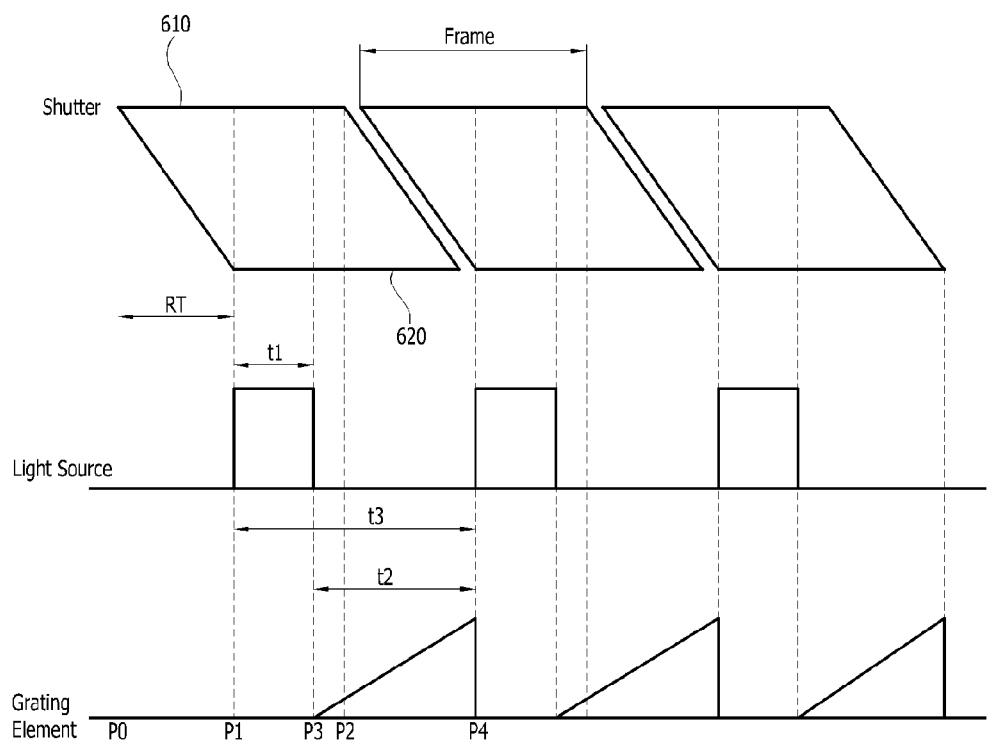
FIG. 12 is a time chart illustrating a method of inspecting a board according to an exemplary embodiment of the present invention.

FIG. 12 is a time chart illustrating a method of inspecting a board according to an exemplary embodiment of the present invention. In FIG. 12, a method of inspecting a board using one projecting section and a camera having a rolling shutter mode is described.

Referring to FIGS. 11 and 12, in order to photograph an image of the measurement target formed on the board 550, the camera 530 sequentially opens a shutter for each line from a first line 610 to a last line 620 of pixels arranged in a matrix form for one frame, to receive the reflection grating image reflected by the board 550. That is, a CMOS image sensor has an electronic shutter function, and since the function corresponds to a rolling shutter mode in which two dimensionally arranged pixels are sequentially scanned for each line and signals thereof are acquired, exposure time is different per line. Thus, the shutter of the camera 530 is opened later from the first line 610 to the last line 610. For example, it is delayed by a rolling time RT, from an open time P0 of the first line 610 to an open time P1 of the last line 620.

The projecting section 510 illuminates the grating pattern light onto the measurement target for a predetermined first time interval t1 existing between a first time P1 at which the shutter for the last line 620 is opened and a second time P2 at which the shutter for the first line 610 is closed. In other words, the light source 512 included in the projecting section 510 generates a light for the first time interval t1, and the light generated from the light source 512 is converted into a grating pattern light by the grating element 514 to illuminate the measurement target formed on the board 550.

When a light is illuminated for the rolling time RT corresponding to a time interval between the open time P0 at which the shutter for the first line 610 is opened and the first time P1 at which the shutter for the last line 620 is opened, the camera 530 may not perfectly photograph a total image for one frame. Thus, the grating pattern light may be illuminated at a time except the rolling time RT, to thereby maintain measurement quality. In addition, in order to maintain measurement quality and allow measurement time to be as short as possible, for example, the projecting section 510 illuminates the grating pattern light onto the measurement target for the first time interval t1 from the first time P1 at which the shutter for the last line 620 is opened. The first time interval t1 indicates at least time for which the camera 530 may sufficiently photograph an image for one frame. The projecting section 510 may illuminate the grating pattern light onto the measurement target for a time longer than the first time interval t1.

When photographing the reflection grating image is completed for one frame by once illuminating the grating pattern light, the grating element 514 is moved using the grating-moving instrument 516 by $2\pi/n$, and the reflection grating image is photographed for a next frame. The 'n' is a natural number greater than or equal to 2.

In order to reduce inspection time, the grating element 514 is moved for a time interval for which the shutter is opened from the first line 610 to the last line 620. For example, the grating element 514 is moved for a second time interval t2 between a third time P3 at which illumination of the projecting section 510 is completed and a fourth time P4 at which the shutter for the last line 620 is closed. In other words, the grating element 514 is moved by using a time for which the light source 512 does not generate light and the rolling time RT of the shutter. In other words, the grating element 514 is not moved for a time interval for which all the lines of the camera 530 simultaneously receive the reflection grating image. Generally, the second time interval t2 for which the grating element 514 is once moved by using the grating-moving instrument 516 such as a piezoelectric (PZT) actuator is greater than the first time interval t1 for which illumination is performed for acquiring an image, and is greater than or equal to the rolling time RT of the camera 530.

Thus, a time required to photograph an image for one frame corresponds to a time of the first time interval t1 for which the projecting section 510 illuminates the grating pattern light, added to the second time interval t2 for which the grating element 514 is moved.

Meanwhile, since the board inspection apparatus 500 employs an n-bucket algorithm, the grating element 514 is moved by $2\pi/n$ per one time and n−1 times in total, and the camera 530 receives the reflection grating image by n times corresponding to the movement of the grating element 514.

As described above, in photographing a plurality of phase-transited images while the grating element 514 is moved by using one projecting section 510 and the camera 530, the grating element 514 is moved for the rolling time RT of the camera 530, for which an image is not substantially photographed, to thereby maintain measurement quality and reduce measurement time.

Figure 13:
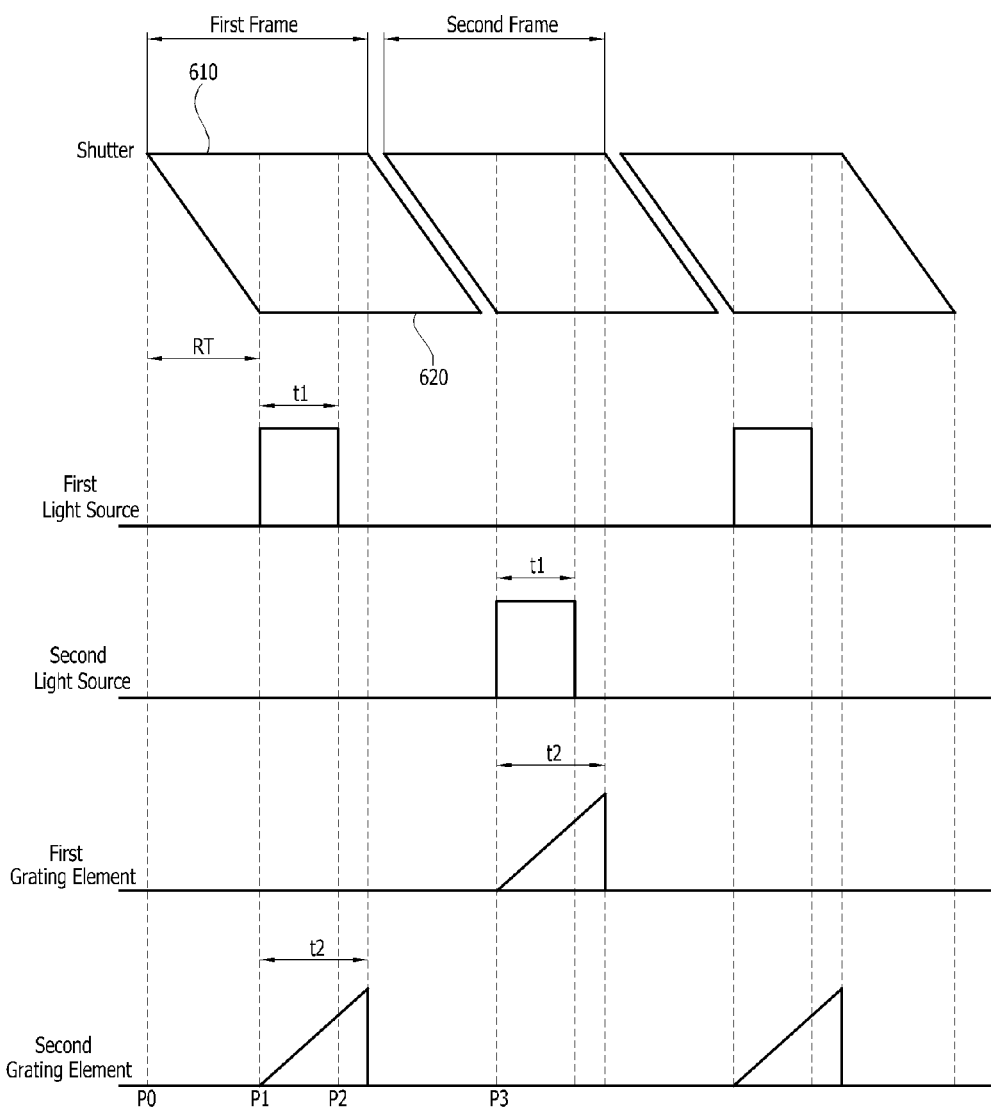
FIG. 13 is a time chart illustrating a method of inspecting a board according to an exemplary embodiment of the present invention.

FIG. 13 is a time chart illustrating a method of inspecting a board according to an exemplary embodiment of the present invention. In FIG. 13, a method of inspecting a board by using two or more projecting sections and a camera having a rolling shutter mode is described.

Referring to FIGS. 11 and 13, in order to photograph an image of the measurement target formed on the board 550, the camera 530 sequentially opens a shutter for each line from a first line 610 to a last line 620 of pixels arranged in a matrix form for one frame. It is delayed by a rolling time RT, from an open time P0 at which the first line 610 is opened to an open time P1 at which the last line 620 is opened.

For example, in a first frame, a first projecting section 510a corresponding to one of at least two projecting sections 510 illuminates a grating pattern light onto the measurement target for a first time interval t1 between a first time P1 at which the shutter for the last line 620 is opened and a second time P2 at which the shutter for the first line 610 is closed. In other words, the light source 512 included in the first projecting section 510a generates a light for the first time interval t1, and the light generated from the light source 512 is converted into a grating pattern light by the grating element 514 to illuminate the measurement target formed on the board 550. The projecting section 510 may illuminate the grating pattern light for a time interval longer than the first time interval t1 according to product specification.

In order to maintain measurement quality and allow measurement time to be as short as possible, for example, the first projecting section 510a illuminates the grating pattern light onto the measurement target for the first time interval t1 from the first time P1 at which the shutter for the last line 620 is opened. The first time interval t1 indicates at least time for which the camera 530 may sufficiently photograph an image for one frame.

When photographing the image is completed for the first frame by using first projecting section 510a, the grating element 514 is moved and the image is required to be photographed again. As shown in FIG. 12, when illumination of the light source 512 and movement of the grating element 514 is sequentially performed, at least time required for photographing the image for one frame corresponds to a time for illumination of the light source 512, added to a time for movement of the grating element 514. However, in FIG. 12, when at least two projecting sections 510 are used, the images are photographed by alternately using the projecting sections 510, to thereby more reduce measurement time.

Particularly, the image for the first frame is photographed by using the first projecting section 510a, and the image for the following second frame is photographed by using another projecting section 510 except the first projecting section 510a, for example, a second projecting section 510b. That is, in the second frame, the second projecting section 510b illuminates the grating pattern light onto the measurement target for a first time interval t1 between a first time P1 at which the shutter for the last line 620 is opened and a second time P2 at which the shutter for the first line 610 is closed. In other words, the light source 512 included in the second projecting section 510b generates a light for the first time interval t1, and the light generated from the light source 512 is converted into a grating pattern light by the grating element 514 to illuminate the measurement target formed on the board 550 in a different direction from the first projecting section 510a.

In order to reduce inspection time, the grating element 514 is moved for a frame interval for which the projecting section 510 does not illuminate the light. For example, a second grating element 514 included in the second projecting section 510b is moved for the first frame in which the reflection grating image is photographed using the first projecting section 510a, and a first grating element 514 included in the first projecting section 510a is moved for the second frame in which the reflection grating image is photographed using the second projecting section 510b. In other words, in the first frame, the second grating element 514 included in the second projecting section 510b is moved for a predetermined second time interval t2 existing between the first time P1 at which the shutter for the last line 620 is opened and the third time P3 at which the shutter for the last line 620 is closed. For example, the second grating element 514 is moved for the second time interval t2 from the first time P1. Generally, the second time interval t2 for which the grating element 514 is once moved by using the grating-moving instrument 516 such as a piezoelectric (PZT) actuator is greater than the first time interval t1 for which illumination is performed for acquiring an image, and is greater than or equal to the rolling time RT of the camera 530.

Thus, a time required to photograph an image for one frame corresponds to a time of the first time interval t1 for which the light source 512 illuminates the light, added to the rolling time RT from the open time P0 at which the first line 610 is opened to the open time P1 at which the last line 620 is opened.

In the present embodiment, two projecting sections 510 are employed for an example. Alternatively, when three or more projecting sections 510 are employed, substantially the same inspection method may be applied.

As described above, in photographing the image of the measurement target by using two or more projecting sections 510, the grating element 514 is moved for a frame interval for which the associated projecting section 510 does not illuminate light, to thereby maintain measurement quality and reduce measurement time more.

Figure 14:
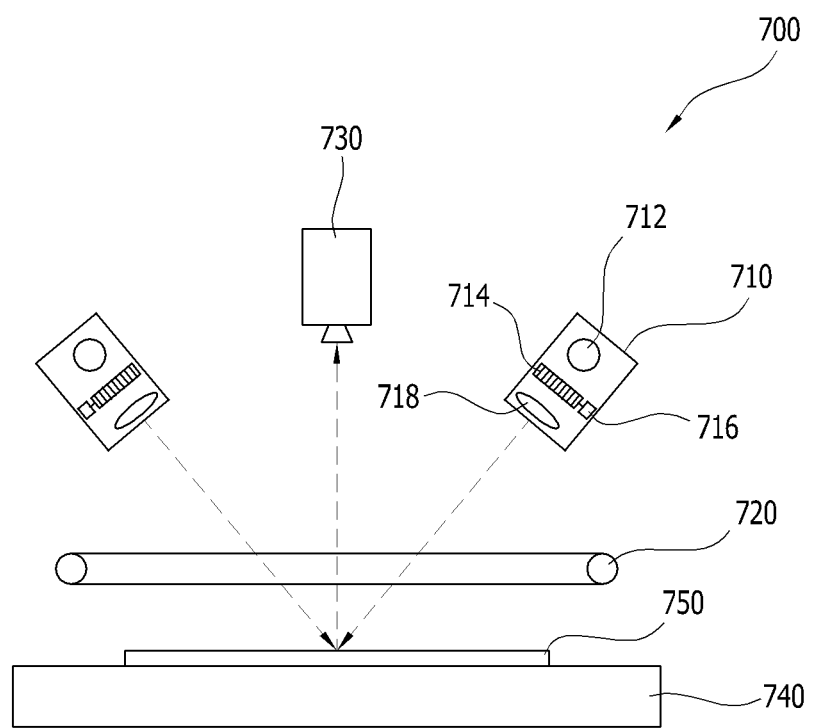
FIG. 14 is a schematic view illustrating a board inspection apparatus according to an exemplary embodiment of the present invention.

FIG. 14 is a schematic view illustrating a board inspection apparatus according to an exemplary embodiment of the present invention. In FIG. 14, a reference numeral 150 can be named for a board or an inspection board.

Referring to FIG. 14, a board inspection apparatus 700 according to an exemplary embodiment of the present invention includes a stage 740 supporting and moving a board 750 on which a measurement target is formed, at least one projecting section 710 illuminating a pattern light onto the board 750, and a camera 730 photographing an image of the board 750. In addition, the board inspection apparatus 700 may further include an illuminating section 720 disposed adjacent to the stage 740 to illuminate a light onto the board 750 independently of the projecting section 710.

The projecting section 710 illuminates the pattern light for acquiring three dimensional information such as height information, visibility information, etc. onto the board 750 in order to measure a three dimensional shape of the measurement target formed on the board 750. For example, the projecting section 710 includes a light source 712 generating a light, a grating element 714 converting the light from the light source 712 into the pattern light, a grating-moving instrument 716 pitch-moving a grating element 714 and a projecting lens 718 projecting the pattern light converted by the grating element 714 onto the measurement target. The grating element 714 may be moved using a grating-moving instrument 716 such as a piezoelectric (PZT) actuator by $2\pi/n$ per one time and n times in total, for phase transition of the pattern light. The 'n' is a natural number greater than or equal to 2. A plurality of projecting sections 710 may be disposed apart from each other by a substantially constant angle with respect to the center of the camera 730 so as to increase inspection accuracy.

The illuminating section 720 may have a circular ring shape, and installed adjacent to the stage 740. The illuminating section 720 illuminates a light onto the board 750 to set up an initial alignment, an inspection area, etc. of the board 750. For example, the illuminating section 720 may include a fluorescent lamp generating white light or a light emitting diode (LED) including at least one of a red LED, a green LED and a blue LED generating red light, green light and blue light, respectively.

The camera 730 photographs an image of the board 750 by the pattern light from the projecting section 710, and an image of the board 750 by the light from the illuminating section 720. For example, the camera 730 may be disposed over the board 750. The camera 730 may employ a camera having a rolling shutter mode using a CMOS sensor. The camera 730 having a rolling shutter mode scans two dimensionally arranged pixels by a line unit to acquire image data. Alternatively, the camera 730 may employ a camera having a global shutter mode using a CCD sensor. The camera 730 having a global shutter mode photographs a snapshot of an image within a field of view to acquire image data once.

The board inspection apparatus 700 having the above structure illuminates the light onto the board 750 by using the projecting section 710 or the illuminating section 720, and the image of the board 750 is photographed by using the camera 730, to thereby measure a three dimensional image and a two dimensional image of the board 750. The board inspection apparatus 700 illustrated in FIG. 14 is just an example, and the board inspection apparatus 700 may be variously modified to include one or more projecting section 710 and the camera 730.

Hereinafter, a method of inspecting a board by using the board inspection apparatus 700 having the above structure will be described in detail. In an exemplary embodiment, a method of inspecting various measurement targets, for example, LED bars mounted on an inspection board such as a jig will be described.

Figure 15:
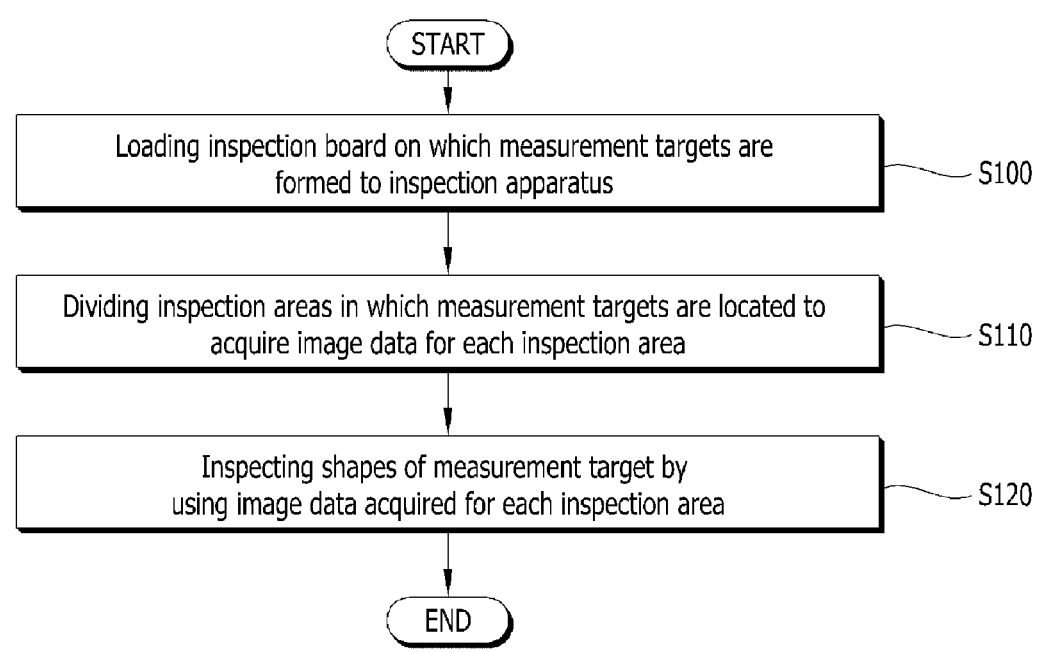
FIG. 15 is a flow chart illustrating a method of inspecting a board according to an exemplary embodiment of the present invention.
Figure 16:
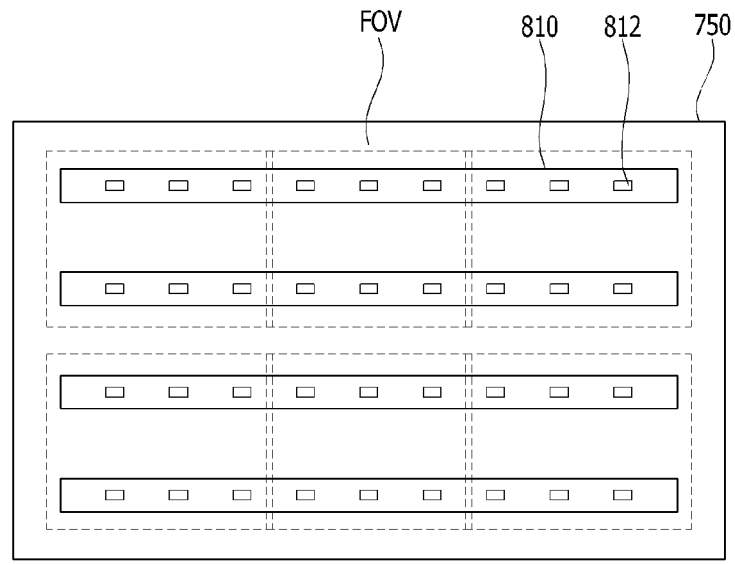
FIG. 16 is a plan view illustrating an inspection board according to an exemplary embodiment of the present invention.

FIG. 15 is a flow chart illustrating a method of inspecting a board according to an exemplary embodiment of the present invention. FIG. 16 is a plan view illustrating an inspection board according to an exemplary embodiment of the present invention.

Referring to FIGS. 14, 15 and 16, in order to inspect a measurement target, the inspection board 750 on which a plurality of measurement targets 810 is disposed is loaded to the board inspection apparatus 700 in step S100. For example, a measurement target 810 may include an LED bar on which LED chips 812 are mounted at regular intervals. The inspection board 750 may correspond to, for example, a fixing supporter, and grooves are formed at the fixing supporter to receive the measurement targets 810. For example, the measurement targets 810 may be disposed on the inspection board 750 to be arranged in a plurality of rows with a constant direction.

After the inspection board 750 is loaded to the board inspection apparatus 700, the inspection board 750 is moved to a measurement location according to movement of the stage 740.

After the inspection board 750 is moved to the measurement location, the image of the inspection board 750 is photographed by using the projecting section 710 or the illuminating section 720 and the camera 730. That is, after illuminating the pattern light onto the inspection board 750 by using the projecting section 710, the camera 730 captures the pattern light reflected by the measurement targets 810 to photograph the image of the inspection board 750. When a size of the inspection board 750 is large, the total area of the inspection board 750 may not be within a field of view FOV of the camera 730. Thus, as shown in FIG. 16, the inspection board 750 is divided into a plurality of areas corresponding to the field of view FOV of the camera 730, and is measured.

Figure 17:
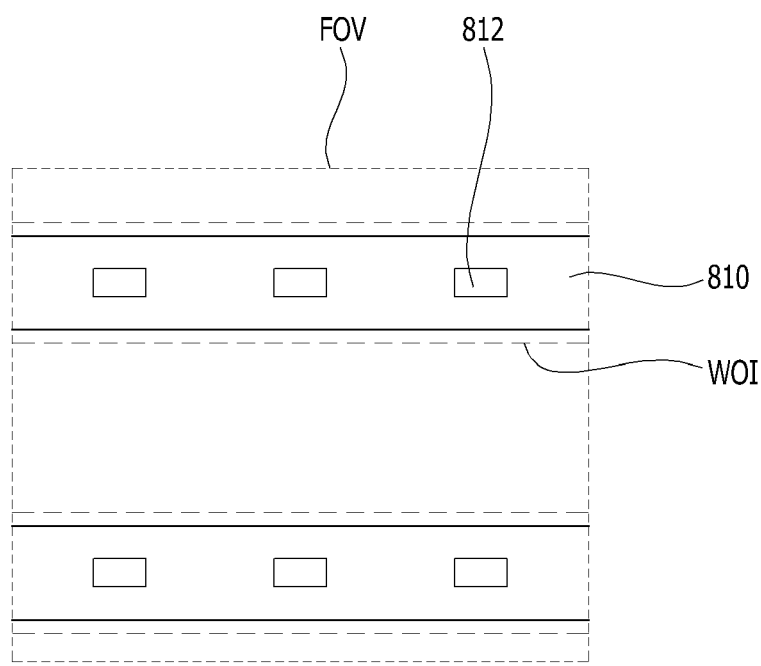
FIG. 17 is a plan view illustrating a partial image of the inspection board in FIG. 16, which is photographed by a camera.

FIG. 17 is a plan view illustrating a partial image of the inspection board in FIG. 16, which is photographed by a camera.

Referring to FIGS. 14, 15 and 17, when a specific area of the inspection board 750 is photographed by using the camera 730, as shown in FIG. 17, there exist a portion in which the measurement target 810 exists and a portion in which the measurement target 810 does not exist in the field of view FOV of the camera 730. Thus, the board inspection apparatus 700 only inspects a portion in which the measurement targets 810 exist except a portion in which the measurement targets 810 do not exist, to thereby reduce measurement time.

Particularly, the board inspection apparatus 700 divides inspection areas (window of interest) WOI in which the measurement targets 810 are located in the field of view FOV of the camera 730 to acquire image data for each the inspection area WOI in step S110. The inspection area WOI is determined to be at least same as the measurement target 810 or a little larger than the measurement target 810 so as to measure the measurement target 810. As the inspection area WOI is larger, image data for being processed increases, and thus the inspection area WOI is determined similar to a range of the measurement target 810, which is substantially to be measured, to thereby decrease data for being processed and reduce data processing time.

The inspection area WOI is determined before acquiring the image data. For example, the inspection area WOI may be determined by a method in which a user himself inputs a location of the measurement target 810 on the inspection board 750 to the board inspection apparatus 700. Alternatively, the inspection area WOI may be determined by teaching of the inspection board 750 using the board inspection apparatus 700. That is, the inspection board 750 loaded to the board inspection apparatus 700 is photographed through the camera 730 to distinguish an area in which the measurement target 810 exists, and determine the distinguished area as the inspection area WOI. The information for the inspection area WOI obtained as the above may be used to basic data for mapping performed later.

A method of acquiring the image data may be various according to sorts of the camera 730.

For example, the camera 730 may employ a camera having a rolling shutter mode using a CMOS image sensor. The camera 730 having a rolling shutter mode sequentially scans two dimensionally arranged pixels by a line unit to acquire image data. The camera 730 having a rolling shutter mode does not scan the entire area of the field of view FOV of the camera 730, but only scans the determined inspection areas WOI by a line unit to acquire the image data for each inspection area WOI.

As described above, the inspection area WOI is selectively scanned in the field of view FOV of the camera 730 through the camera 730 having a rolling shutter mode to acquire the image data for the measurement target 810, thereby reducing scanning time of the camera 730 and total photographing time of the camera 730.

Alternatively, the camera 730 may employ a camera having a global shutter mode using a CCD image sensor. The camera 730 having a global shutter mode photographs a snapshot of a total area of the field of view FOV to selectively acquire the image data for the inspection areas WOI out of the total area of the field of view FOV.

After acquiring the image data for each inspection area WOI, shapes of the measurement targets 810 are inspected by using the image data in step S120.

In inspecting the measurement target 810, one measurement target 810 is divided into a plurality of areas to be photographed, according to the field of view FOV of the camera 730. Thus, the photographed images for each area are combined to form a total image of the measurement target 810.

Particularly, in dividing the inspection board 750 into a plurality of field of views FOV and photographing the field of views FOV, the board inspection apparatus 700 photographs the field of views FOV to be a little overlapped, and the photographed images are mapped to form the total image of the measurement target 810.

In mapping the images, the image data are compared with each other in an overlapped area to form an image of a boundary portion between the field of views FOV. In mapping the images, the image data with respect to an entire area of the overlapped area are not compared, but the image data only corresponding to the inspection areas WOI are compared. In other words, the images are mapped using the image data for each inspection area WOI, which are acquired by measuring the inspection areas WOI.

As described above, in mapping the images with respect to the overlapped area between the field of views FOV of the camera 730, the image data only corresponding to the inspection area WOI, not a total area, are compared, to thereby decrease data for being processed, and reduce data processing time.

The measurement target 810 is inspected using the image data for the total image of the measurement target 810, which are acquired by the above described image-mapping. For example, in case that the measurement target 810 is an LED bar, it is inspected that an LED chips 812 are accurately mounted on the board.

The above described method of inspecting a board may be applied to a case that an area for inspection is separated on one board, in addition to a case that the measurement targets are separately mounted on an inspection board.

As described above, in measuring an inspection board on which a plurality of measurement targets is mounted, an inspection area in which the measurement targets are located is only selectively measured, to thereby reduce photographing time of a camera. In addition, since image data of the inspection area only are used, data for being processed are decreased, and especially, data for comparison in mapping images are decreased to greatly reduce measurement time.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A three dimensional shape measurement apparatus comprising:
   m projecting sections, each of which includes a light source and a grating element, and, while moving the grating element by n times, projects a grating pattern light onto a measurement target for each movement, wherein the 'n' and the 'm' are natural numbers greater than or equal to 2;
   an imaging section photographing a grating pattern image reflected by the measurement target; and
   a control section controlling that, while photographing the grating pattern image by using one of the m projecting sections, a grating element of the one of the m projecting sections is not moved and a grating element of at least another projecting section is moved.

2. The three dimensional shape measurement apparatus of claim 1, when the m is 2, wherein while photographing the grating pattern image by one time by using a first projecting section, the control section moves the grating element having a periodic structure of a second projecting section by 1/n of a period of the periodic structure, and then while photographing the grating pattern image by one time by using the second projecting section, the control section moves the grating element of the first projecting section by 1/n of the period of the periodic structure.

3. The three dimensional shape measurement apparatus of claim 1, when the m is greater than or equal to 3, wherein the control section photographs the grating pattern image by m times by using the projecting sections for one time respectively, from a first projecting section to an m-th projecting section, and a grating element having a periodic structure of a projecting section that is not used for the photographing time of the m times is moved by 1/n of a period of the periodic structure for non-photographing time.

4. The three dimensional shape measurement apparatus of claim 3, wherein the control section controls that each projecting section moves the grating element thereof before at least two photographing times prior to projecting the grating pattern light.

5. The three dimensional shape measurement apparatus of claim 1, wherein the control section controls that the grating pattern image is photographed by using one projecting section of the m projecting sections, and then for immediately following photographing time of another projecting section, a grating element of the one projecting section is moved.

* * * * *

UNITED STATES PATENT AND TRADEMARK OFFICE
CERTIFICATE OF CORRECTION

PATENT NO. : 8,878,929 B2  
APPLICATION NO. : 12/787728  
DATED : November 4, 2014  
INVENTOR(S) : Ho Kim et al.

Page 1 of 1

It is certified that error appears in the above-identified patent and that said Letters Patent is hereby corrected as shown below:

On the Title Page

Item (75) in the second inventor name:  
Change "Kwang-Ill Kho" to --Kwangill Koh--.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*